United States Patent
Hori (10) Patent No.: US 7,562,242 B2
(45) Date of Patent: Jul. 14, 2009

(54) ELECTRONIC APPARATUS HAVING ELECTRIC POWER SAVING FUNCTION

(75) Inventor: Masanori Hori, Echizen (JP)

(73) Assignee: Orion Electric Company, Ltd., Fukui-ken (JP)

(*) Notice: Subject to any disclaimer, the term of this patent is extended or adjusted under 35 U.S.C. 154(b) by 440 days.

(21) Appl. No.: 11/362,765

(22) Filed: Feb. 28, 2006

(65) Prior Publication Data

US 2006/0206734 A1    Sep. 14, 2006

(30) Foreign Application Priority Data

Mar. 11, 2005    (JP)    ............... 2005-069258

(51) Int. Cl.
  *G06F 1/32* (2006.01)
(52) U.S. Cl. .................. 713/324; 713/323; 715/716
(58) Field of Classification Search ............... 713/323, 713/324, 330; 715/716
See application file for complete search history.

(56) References Cited

U.S. PATENT DOCUMENTS

| | | | |
|---|---|---|---|
| 6,266,714 B1 * | 7/2001 | Jacobs et al. ........... | 710/14 |
| 6,675,233 B1 * | 1/2004 | Du et al. ................ | 710/14 |
| 7,028,203 B2 * | 4/2006 | Nakai .................... | 713/340 |
| 7,080,271 B2 * | 7/2006 | Kardach et al. ........ | 713/323 |

FOREIGN PATENT DOCUMENTS

| | | |
|---|---|---|
| JP | 08-313905 | 5/1995 |
| JP | 09-139924 | 11/1995 |
| JP | 10-090648 | 9/1996 |
| JP | 2002-123223 | 10/2000 |
| JP | 2002-123240 | 10/2000 |
| JP | 2002-172981 | 12/2000 |
| JP | 2002-229021 | 2/2001 |
| JP | 2003-050053 | 8/2001 |
| JP | 2003-271106 | 3/2002 |
| JP | 2003-274317 | 3/2002 |
| JP | 2003-298684 | 4/2002 |
| JP | 2004-004217 | 5/2002 |
| JP | 2004-282138 | 3/2003 |
| JP | 2004-157559 | 1/2004 |

* cited by examiner

*Primary Examiner*—Thuan N Du
(74) *Attorney, Agent, or Firm*—Reed Smith LLP; Juan Carlos A. Marquez, Esq.

(57) ABSTRACT

A memory section stores a plurality of electric power saving modes classified into groups by combining a plurality of electric power saving items in a television image receiver, a DVD or an LCD. Microcomputer controls one of the plurality of the electric power saving modes to be set to ON/OFF, thereby making it possible to ON/OFF control a plurality of electric power saving items included in that electric power saving mode includes all together. In accordance with this electric power saving mode, a dimming level of a backlight is decreased to a preset brightness or the backlight is automatically shut down.

8 Claims, 11 Drawing Sheets

<Group 1 detail setting>

(1) When no signal is supplied at the time
of tuner receiving     ON/OFF
(2) When no signal is supplied from the outside
(AV, S, component, or PC)     ON/OFF
(3) When no change occurs with video image ON/OFF
(4) When no main body key is operated     ON/OFF

/ 42

(b)

<Group 2 detail setting>

(1) When no signal is supplied at the time of tuner
receiving     ON/OFF
(2) When no signal is supplied from the outside
(AV, S, component, or PC)     ON/OFF
(3) During main body DVD reproduction     ON/OFF
(4) During sleep mode     ON/OFF
(5) During picture mode     ON/OFF
(6) Dimming setting during PC input     ON/OFF
(7) Dimming interlock in clock time     ON/OFF

/ 42

(c)

<Group 3 detail setting>

(1) Automatic counting of use frequency     ON/OFF
(2) Power OFF input system not used by
user     ON/OFF
(3) Power OFF input system other than
input system currently used     ON/OFF

When group 3 of electric power saving function has been selected, power supply to the following circuits is temporarily stopped.
When any one of the following functions (modes) has been selected, there is a possibility that it takes long to activate mode. Do you want to set group 3 to ON?

■ YES         NO

Power supply stoppage circuit
DVD   HDD   PC input   HDMI input

ELECTRONIC APPARATUS HAVING ELECTRIC POWER SAVING FUNCTION

BACKGROUND OF THE INVENTION

1. Field of the Invention

The present invention relates to an electronic apparatus including display means for making a display in accordance with a command from control means. In particular, the present invention relates to an electronic apparatus having an electric power saving function, the electronic apparatus including a liquid crystal display unit for illuminating an object with backlight as the display means.

2. Description of the Related Art

Conventionally, a personal computer includes a power supply management function for, in the case where no change occurs with a video image signal, stopping power supply to display means such as a liquid crystal display unit or a CRT (Cathode Ray Tube) to establish a standby state. Conventionally, there have been proposed a variety of techniques relating to power supply management in such a liquid crystal display unit. For example, in Japanese Patent Application Laid-open Nos. 2002-123223 and 2003-271106 or the like, there is proposed a liquid crystal display unit configured to reduce brightness of a backlight based on whether a video image displayed on the liquid crystal display unit is a still image or a moving image.

In the meantime, in recent years, there is a demand for energy saving. An electric power saving function is widely employed for a variety of electronic apparatuses as well as a personal computer. For example, in Japanese Patent Application Laid-open No. 09-139924, there is proposed a video image display unit for carrying out CD ROM reproduction with a music CD and a video image display in which, in the case where a CD to be reproduced is a music CD, power supply of a display system is automatically turned OFF. In addition, in Japanese Patent Application Laid-open No. 2003-050053, there is proposed a fan heater including a liquid crystal display unit having a backlight function, the fan heater supplying hot air into a room, the fan heater being configured to reduce brightness of a light source of the backlight more significantly than during normal operation, while being set in a wakeup timer operation standby mode and a sleep timer operation mode.

As described above, a variety of electronic apparatuses activate an electric power saving function in the case where a no-signal state has continued for a predetermined period of time. Conditions for the electric power saving function to be activated variously depend on functions of each of the electronic apparatuses. Thus, some composite mechanisms including a plurality of functions, for example, some of the composite type television image receivers, each of which has a liquid crystal display unit as display means and which includes a storing and reproducing unit for carrying out reproduction and/or recording of an information recording medium such as a DVD or a hard disk, have a plurality of electric power saving functions which are different depending on their respective functions. Thus, for example, when a user selects a plurality of electric power saving functions, there has been a need for selecting the items on a one by one basis, and there has been inconvenience and a time interval for providing settings so that the user can select a desired electric power saving function. In addition, there has been a problem that operability is impaired, and the user cannot easily select one's desired electric power saving function.

SUMMARY OF THE INVENTION

The present invention has been made to solve the above-described problems. It is an object of the present invention to provide an electronic apparatus having an electric power saving function for, in the case where a plurality of electronic power saving items are set to ON/OFF, and then, an electric power saving function is selected, enabling a user to select a desired electric power saving function with a simple operation.

According to a first aspect of the present invention, there is provided an electronic apparatus having an electric power saving function, including: display means for making a display in accordance with a command from control means; power supply control means for restricting or shutting down power supply to at least the display means during an electric power saving mode; and storage means for storing the electric power saving mode, wherein a plurality of electric power saving modes classified into groups by combining a plurality of electric power saving items are stored in the storage means, and one of the plurality of the electric power saving modes is controlled to be set to ON/OFF, thereby controlling a plurality of the electric power saving items included in the electric power saving modes to be set to ON/OFF all together.

According to a second aspect of the present invention, there is provided the electronic apparatus having an electric power saving function according to the first aspect, wherein each of the electric power saving items in the electric power saving modes classified into groups can be controlled to be set to ON/OFF individually.

According to a third aspect of the present invention, there is provided the electronic apparatus having an electric power saving function according to the first or second aspect, comprising a function for serially numbering the electric power saving modes classified into groups and, when a high order electric power saving mode is set to ON, turning ON a low order electric power saving mode in conformity with the ON setting.

According to a fourth aspect of the present invention, there is provided the electronic apparatus having an electric power saving function according to any one of the first to third aspects, comprising: a warning display function for, when any one of the electric power saving modes classified into groups is selected, displaying a disadvantage attained when the electric power saving mode has been selected; and an electric power saving effect display function for indicating an electric power saving effect according to each of the electric power saving modes.

According to a fifth aspect of the present invention, there is provided the electronic apparatus having an electric power saving function according to any one of the first to fourth aspects, wherein the display means is a liquid crystal display unit for use in a television receiver or a personal computer, and includes power supply control for a backlight which illuminates the liquid crystal display unit during the electric power saving mode.

With the electronic apparatus having an electric power saving function according to the first aspect of the present invention, there is no need for a user to individually select a plurality of electric power saving items, respectively, and the user can turn ON/OFF for each group all together. Thus, an electric power saving mode can be selected very simply. In particular, in a composite type electronic apparatus, a variety of electric power saving items exists, and there is no need for making a selection for each electric power saving item. Thus, an electric power saving mode can be efficiently selected and excellent operability is achieved.

With the electronic apparatus having an electric power saving function according to the second aspect of the present invention, each of electric power saving items in electric power saving modes classified into groups is controlled to be set to ON/OFF individually, thereby making it possible to freely select an electric power saving mode according a user's preference or habit.

With the electronic apparatus having an electric power saving function according to the third aspect of the present invention, electric power saving modes in the high order group are set to ON, and concurrently, electric power saving modes in the low order group are also set to ON, thus making it possible to select electric power saving modes more easily.

With the electronic apparatus having an electric power saving function according to the fourth aspect of the present invention, when a user has selected any of the electric power saving modes classified into groups, disadvantage and electric power saving effect in that power saving mode are displayed, and the user can select a desired item after considering these disadvantage and effect.

With the electronic apparatus having an electric power saving function according to the fifth aspect of the present invention, power consumption of a liquid crystal display unit can be reduced by controlling a backlight for illuminating the liquid crystal display unit during an electric power saving mode.

BRIEF DESCRIPTION OF THE DRAWINGS

FIG. 5 (*b*) shows a detail setting screen of group 2; and FIG. 5 (*c*) shows a detail setting screen of group 3;

DESCRIPTION OF THE PREFERRED EMBODIMENT

Hereinafter, preferred embodiments which are the best mode for carrying out the present invention will be described with reference to FIGS. 1 to 11. Of course, the present invention can be easily applied to embodiments other than the described embodiment without departing from the spirit of the invention.

In the present embodiment, there is shown a case where the present invention is applied to a composite type electronic apparatus including a liquid crystal display unit (hereinafter, simply referred to as an LCD) as display means, the electronic apparatus having a storing and reproducing unit for a DVD or a HDD (hard disk drive) and a television image receiver integrated therewith. A whole equipment configuration will be described with reference to a block diagram of FIG. 1. A composite type electronic apparatus 1 includes: an analog tuner and AV block 2 which processes an analog system signal; a DVD block 3 as a storing and reproducing unit which processes a signal from a DVD; a digital tuner block 4 which processes a signal from a digital tuner; an HDMI (High Definition Multimedia Interface) block 5 which carries out a process for transmitting and receiving video image, voice, and control signals all together; a component block 6 which processes a component signal (such as Y, U, and V signals and S terminal signal); and a PC block 7 which processes a signal from a PC, wherein analog signals from the analog tuner and AV block 2 and the DVD block 3 are outputted to a SCALER IC 8; signals from the HDMI block 5, the component block 6, and the PC block 7 are outputted to an A/D IC 9, and the outputted signals are A/D converted; and the A/D converted signals are outputted to the SCALER IC 8. The resulting signals are outputted from the SCALER IC 8 to a microcomputer 10 which is power supply control means. A power block 11 is controlled by means of the microcomputer 10 and a backlight 13 of an LCD 12 is controlled.

Figure 1:
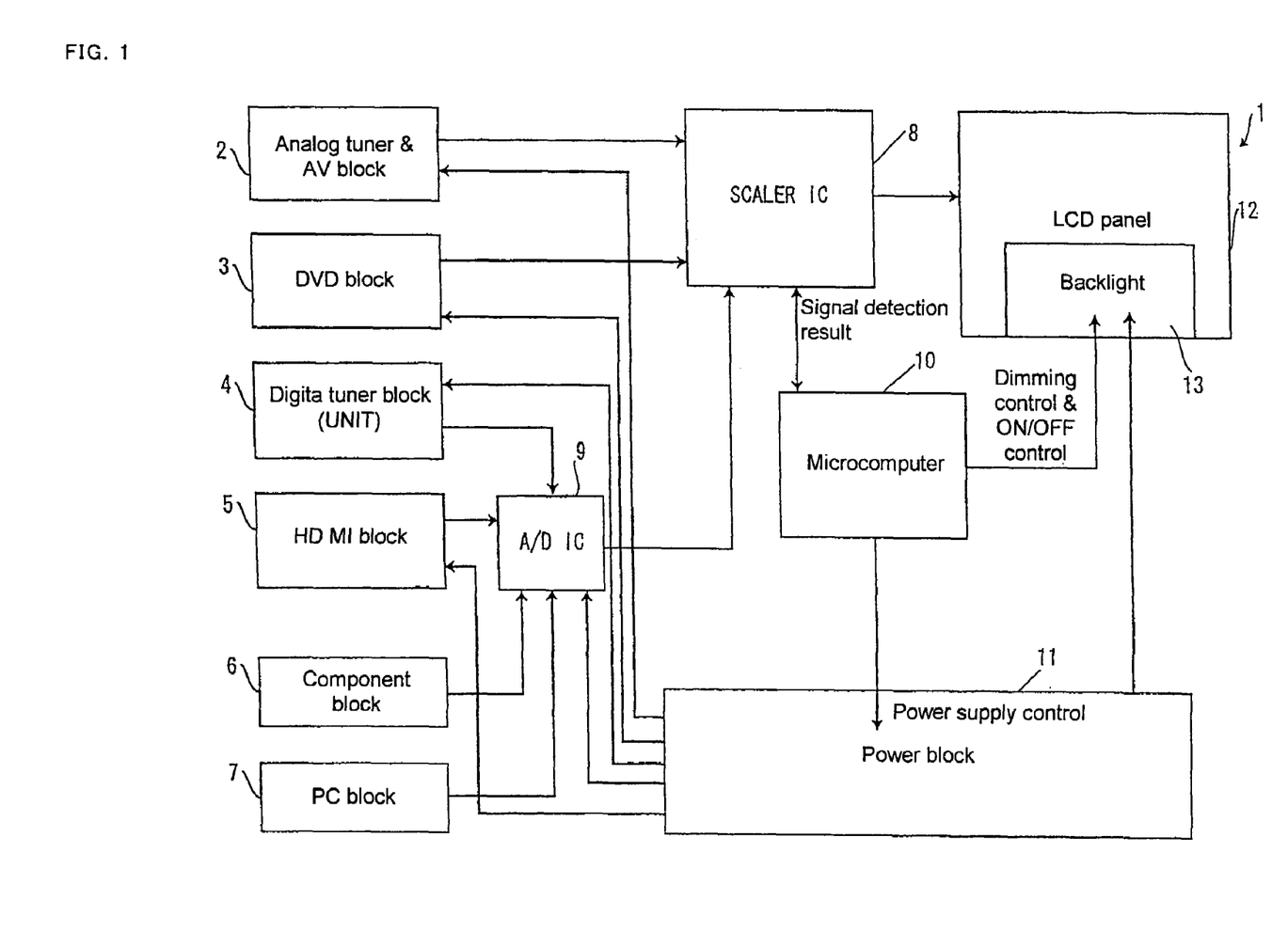
FIG. 1 is a block diagram depicting a schematic configuration of a whole electronic apparatus according to an embodiment of the present invention.
Figure 2:
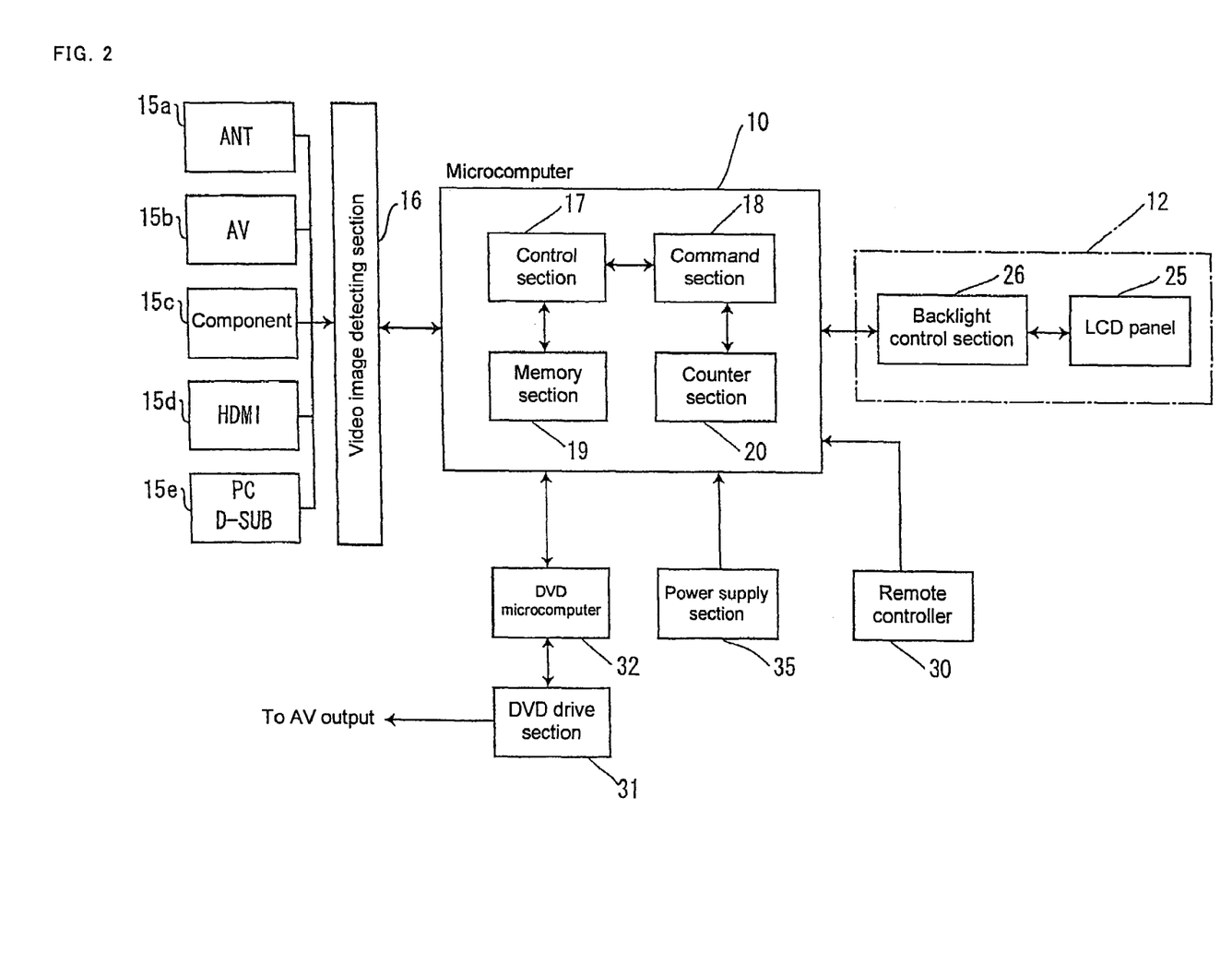
FIG. 2 is a block diagram depicting an outline of a microcomputer internal processing operation of the same electronic apparatus.

Now, an outline of internal processing of the microcomputer 10 will be described with reference to a block diagram of FIG. 2. The composite type electronic apparatus 1 mainly consists of: an antenna terminal 15*a* to which a broadcast signal from an antenna is inputted, the antenna terminal 15*a* serving as an external connection terminal; an AV terminal 15*b* to which a video image and voice signal from an AV apparatus such as a DVD player or a hard disk drive is inputted; a component terminal 15*c* to which a high image quality component signal (such as Y, U, and V signals or an S terminal signal) is inputted; an HDMI terminal 15*d* to which a digital signal is inputted; and a PCD-SUB terminal 15*e* to which each of R, G, and B signals from a personal computer (hereinafter, simply referred to as a PC) is inputted, wherein signals from these terminals 15*a* to 15*e* are outputted from a video image detecting section 16 to the microcomputer 10. The microcomputer 10 has a control section 17, a command section 18, a memory section 19, and a counter section 20, wherein the microcomputer 10 carries out a video image adjusting process such as color demodulation, contrast, and color density, and carries out a processing operation for displaying a video image on the LCD 12. The microcomputer 10 controls a backlight control section 26 of an LCD panel 25 to control brightness of the LCD 12. In addition, this microcomputer 10 carries out a processing operation in response to a remote control operation by the command section 18 using a key input signal from a remote controller 30 or a main body key (not shown) which is input means by which an input operation is made by a viewer. The memory section 19 stores ON/OFF information for an electric power saving function and light dimmer information or the like for setting brightness of the LCD 12 according to each electric power saving mode, depending on a plurality of the set electric power saving modes. The counter section 20 carries out timer counting when the electric power saving function is operated. A signal from a DVD microcomputer 32 which controls a DVD drive section 31 is outputted to the microcomputer 10, and the electric power saving mode is controlled in the DVD drive section 31. Reference numeral 35 in FIG. 2 denotes a power supply section which supplies power to the microcomputer 10.

The memory section 19 stores a plurality of electric power saving modes classified into groups by combining a plurality of electric power saving items in the television image receiver, the DVD, and the LCD 12, and the microcomputer 10 carries out an ON/OFF control of one of the plurality of electric power saving modes, thereby making it possible to carry out the ON/OFF control of a plurality of electric power saving items included in the electric power saving mode all together. For example, in the present embodiment, there is a composite type electronic apparatus formed by combining a storing and reproducing unit such as a DVD or a hard disk drive and a television image receiver. Group 1 includes electric power saving modes which include electric power saving items such as: (1) when an RF signal is received, a video image signal input is eliminated due to the end of a broadcast signal or connector disconnection, and then, a dimming level of the backlight 13 is lowered to zero for 15 minutes until auto shutdown works; (2) in the case where no input occurs at the time of external input (AV, S, component, and PC), the dimming level of the backlight 13 is lowered to zero until auto shutdown works; (3) if a state in which no change is observed with a video image signal continues for 15 minutes, the dimming level of the backlight 13 is lowered to zero, and, if this state continues for further 15 minutes, auto shutdown works; and (4) if no input occurs from a main body key and the remote controller 30 for three hours, auto shutdown works.

Group 2 includes electric power saving modes which include electric power saving items such as: (1) when an RF signal is received, if a noise screen (or a blue background screen) continues for one minute, the backlight 13 is turned OFF, and further, auto shutdown works in five minutes after the turn OFF; (2) if no input state continues for one minute at the time of an external input (AV, S, component, or PC), the backlight 13 is turned OFF, and further, auto shutdown works in five minutes after the turn OFF; (3) when a DVD logo screen is displayed, the dimming level of the backlight 13 at the time of CD reproduction is lowered by half; (4) when a sleep mode is set, the dimming level of the backlight 13 is automatically lowered by half, and the dimming level of the backlight 13 is further lowered in response to a timer setting time. For example, in the case where the setting time is set to 60 minutes or more, when the remaining time reduces to ½ of the setting time, the dimming level of the backlight 13 is lowered to zero; (5) at the time of each of three picture modes, for example, sports, standard, and movie modes, while adjustment of the brightness of each picture mode is normally made only by setting of brightness/contrast, the dimming level of the backlight 13 is added to work with for the adjustment. As a specific example, in the sports mode, the dimming level is set to high (in steps of +12 to +16); in the standard mode, the dimming level is set to middle (in steps of +5 to +8); and in the movie mode, the dimming level is set to minimum (0 step); (6) at the time of PC input, the dimming level is set to middle (in steps of +8) from the start; and (7) with respect to a clock function, from AM10:00 to PM4:00, the dimming level of the backlight 13 is set to middle, and at the other time intervals, no dimming of the backlight 13 is carried out.

Group 3 includes electric power saving modes which include electric power saving items such as: (1) frequency of an input system being used by a user is automatically counted, and a power supply required for an input system normally used with less frequency is turned OFF; (2) an input system not used by a user is manually set, and a power supply exclusively used for the input system thus set as not used by the user is turned OFF; and (3) a power supply is turned ON only at a circuit portion required for a currently used input system, and power supplies of other unnecessary circuit portions are turned OFF. The classified groups of these electric power saving modes are numbered for small, middle, and large reduction effect of power consumption. That is, the reduction effect of power consumption increases as the group number increases from 1 to 2 and 3.

Figure 3:
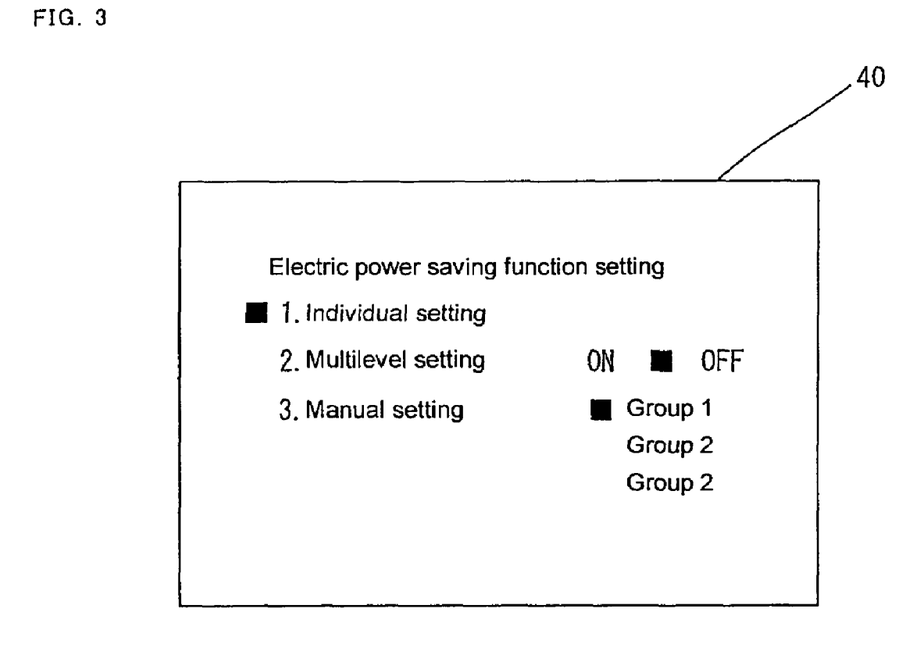
FIG. 3 is a front view showing a function setting screen of the same electronic apparatus.
Figure 4:
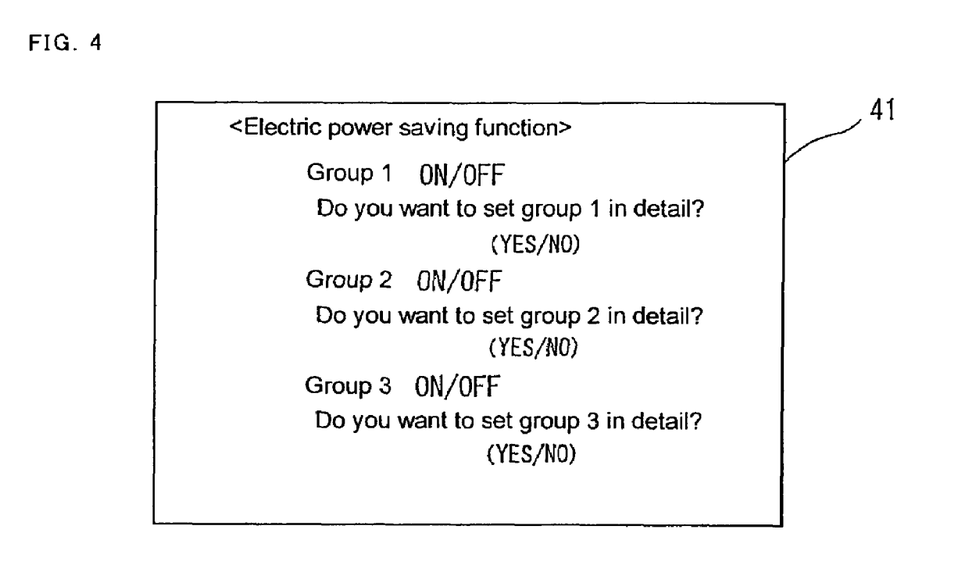
FIG. 4 is a front view showing an electric power saving function screen of the same electronic apparatus.
Figure 5:
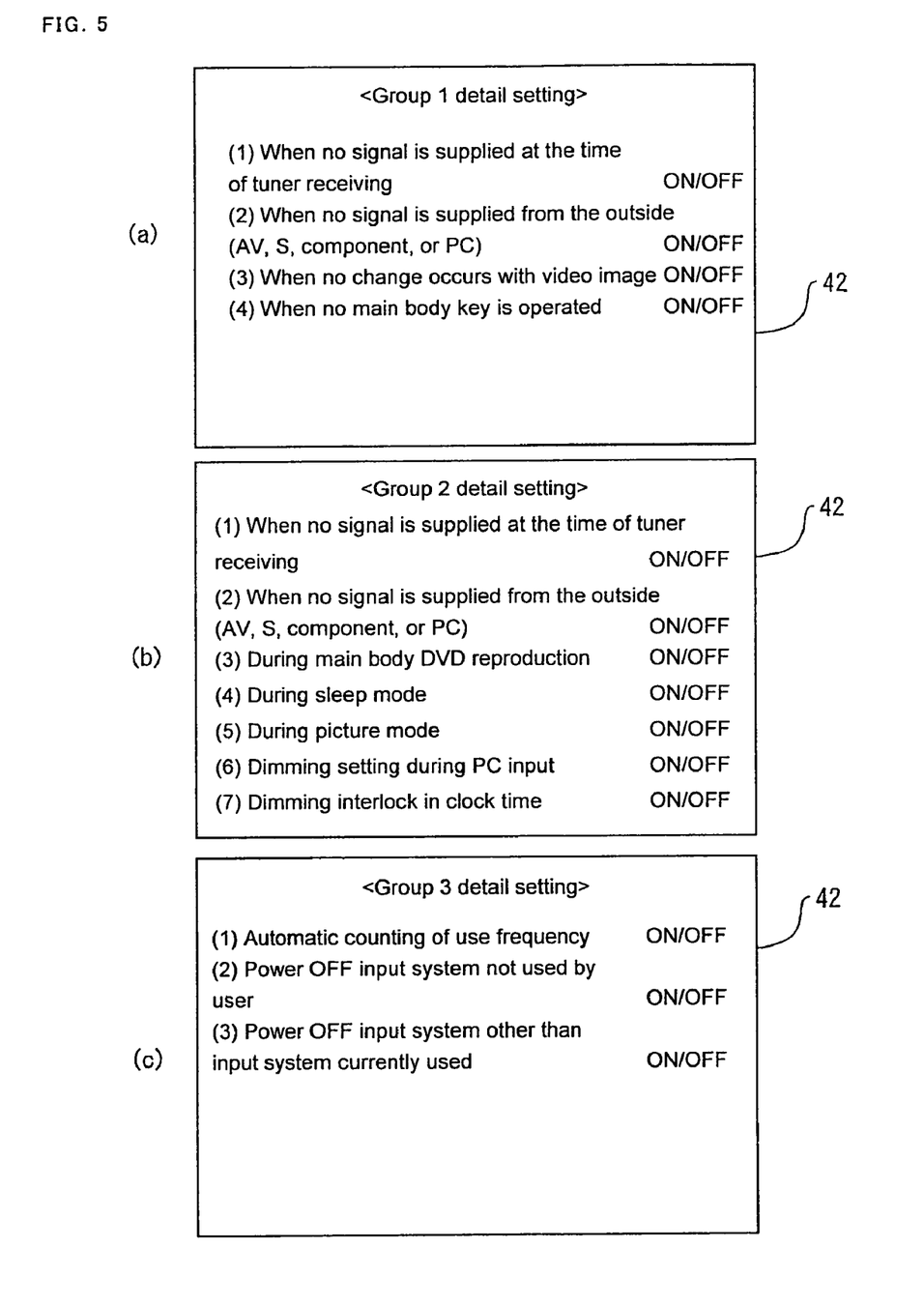
FIG. 5 is a front view showing a detail setting screen of each group of the same electronic apparatus, wherein FIG. 5 (*a*) shows a detail setting screen of group 1.
Figure 6:
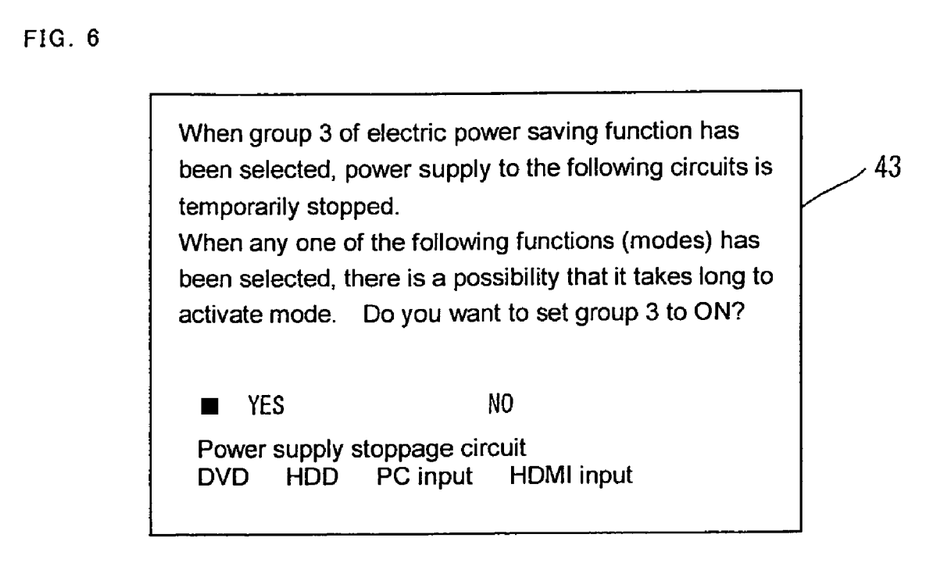
FIG. 6 is a front view showing a warning display screen of the same electronic apparatus.
Figure 7:
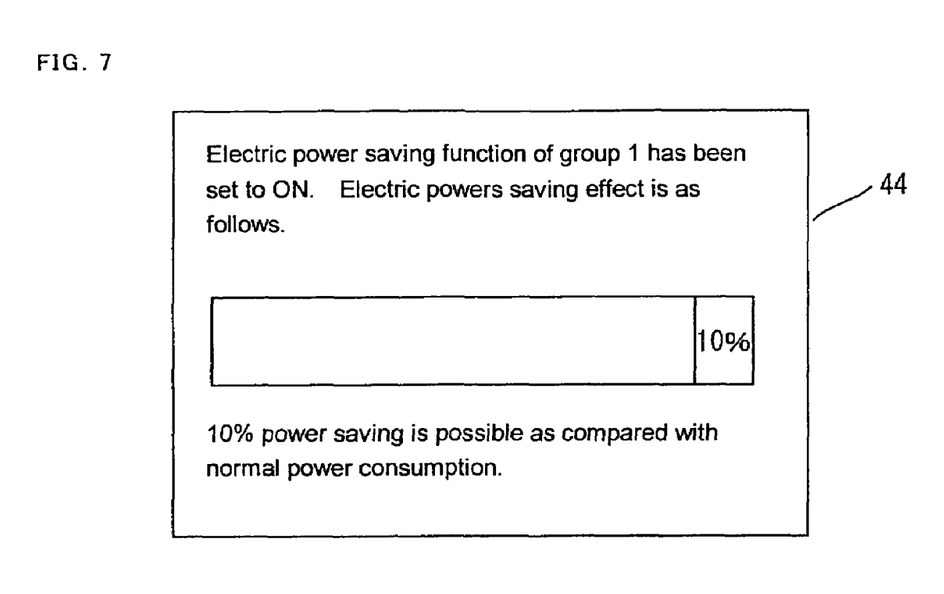
FIG. 7 is a front view showing an electric power saving effect display screen during an electric power saving mode of the same electronic apparatus.

In these electric power saving modes, when a user supplies a display command via the remote controller 30, and, for example, a menu key is pressed, a function setting screen 40 is displayed as shown in FIG. 3. On the function setting screen 40, the setting items such as 1. individual setting, 2. multilevel setting, and 3. manual setting, are displayed. A viewer selects a desired setting item by a selection key such as a cursor key. When 1. individual setting is selected, an electric power saving function screen 41 is displayed as shown in FIG. 4 so that ON/OFF can be selected for each of the classified groups of electric power saving modes. 2. multilevel setting is generally turned OFF. However, when 2. multilevel setting is set to ON, and when a high order group is set to ON, electric power saving modes in the low order groups are automatically set to ON. That is, when group 2 is selected, group 1 is automatically set to ON. When group 3 is selected., all groups 1 to 3 are automatically set to ON. When 3. manual setting is selected, the screen is changed to a detail setting screen 42 displaying the contents of setting items of each of groups 1 to 3, as shown in FIGS. 5 (*a*) to 5 (*c*). Here, ON/OFF can be selected individually for each of the groups 1 to 3 or for the detail settings in the groups. In addition, a selection can be made as to whether or not each of the electric power saving items is displayed in the electric power saving mode of the groups 1 to 3. In addition, when a selection is made so as to turn ON any of groups 1 to 3, the screen is changed to a warning display screen 43 according to the selected one of groups 1 to 3, as shown in FIG. 6. Then, a disadvantage attained when that electric power saving mode has been selected is displayed, and then, a current mode is changed to arbitrary one of the electric power saving modes classified into groups on the warning display screen 43. Further, in the case where a disadvantage displayed on the warning display screen 43 is recognized, a current screen is changed to a display screen 44 indicating an electric power saving effect according to each electric power saving mode as shown in FIG. 7. This display screen 44 makes a graphic display notifying the user that 10% electric power saving is possible, for example.

Figure 8:
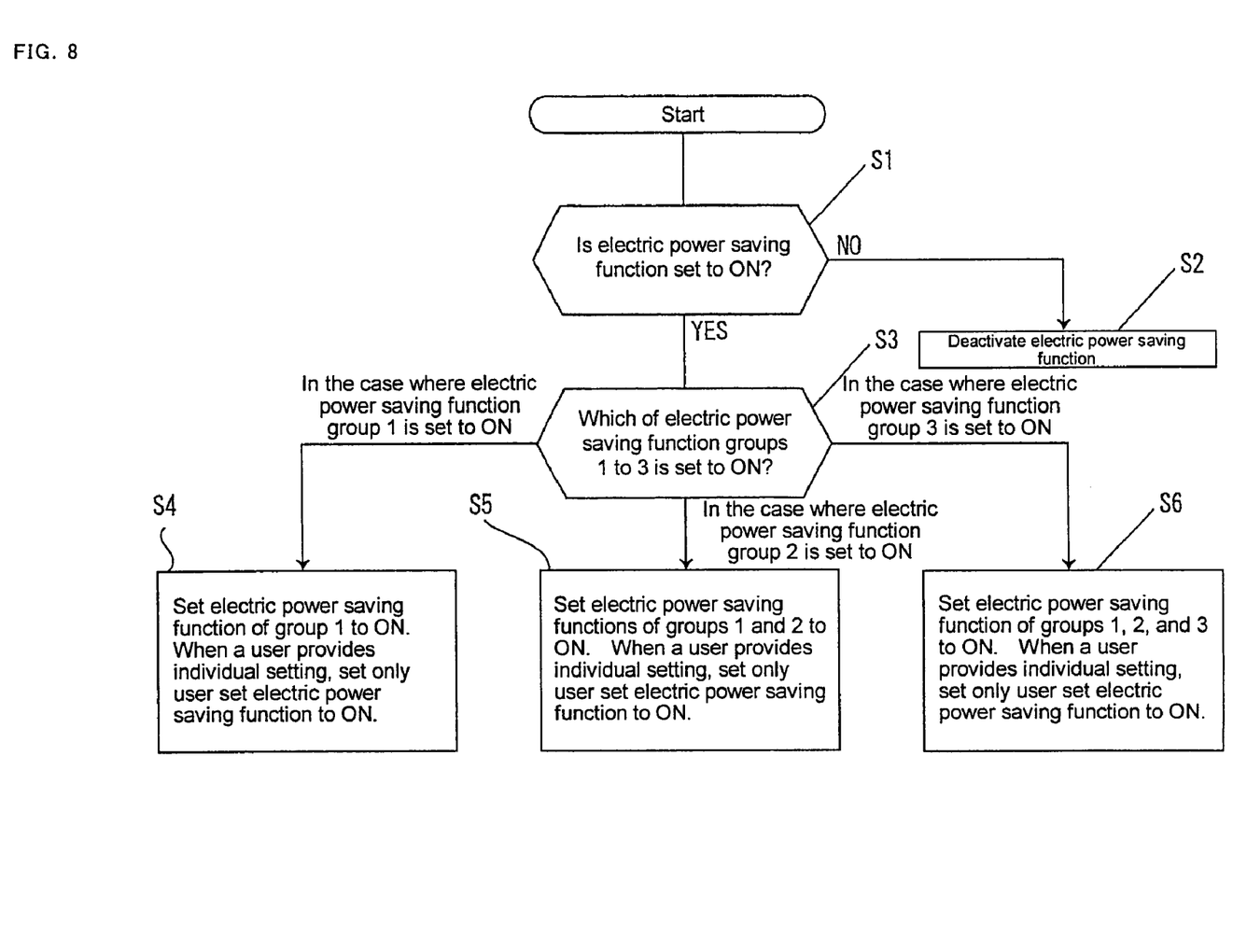
FIG. 8 is a flowchart showing control of a backlight for each group during an electric power saving mode of the same electronic apparatus.

Now, an electric power saving mode in the present embodiment will be described with reference to a flow chart shown in FIG. 8. When a composite type electronic apparatus 1 is powered ON, it is judged whether or not an electric power saving function is set to ON (step S1). The electric power saving function is deactivated if it is set to OFF (step S2). In the case where this function is set to ON, it is judged which one of groups 1 to 3 is selected (step S3). In the case where group 1 is selected, it is judged whether one set of electric power saving items of group 1 is set all together or one or more of the electric saving items thereof are set individually on an electric power saving function screen 41 by a user. When the electric power saving items are set all together, the electric power saving items (1) to (4) of group 1 are set to ON all together. When one or more of the electric saving items are set individually, only the user-selected electric power saving items of group 1 are set to ON (step S4). In the case where group 2 or 3 is selected, as in group 1, control is made so as to establish an electric power saving mode in response to the user selection (steps S5, S6).

Figure 9:
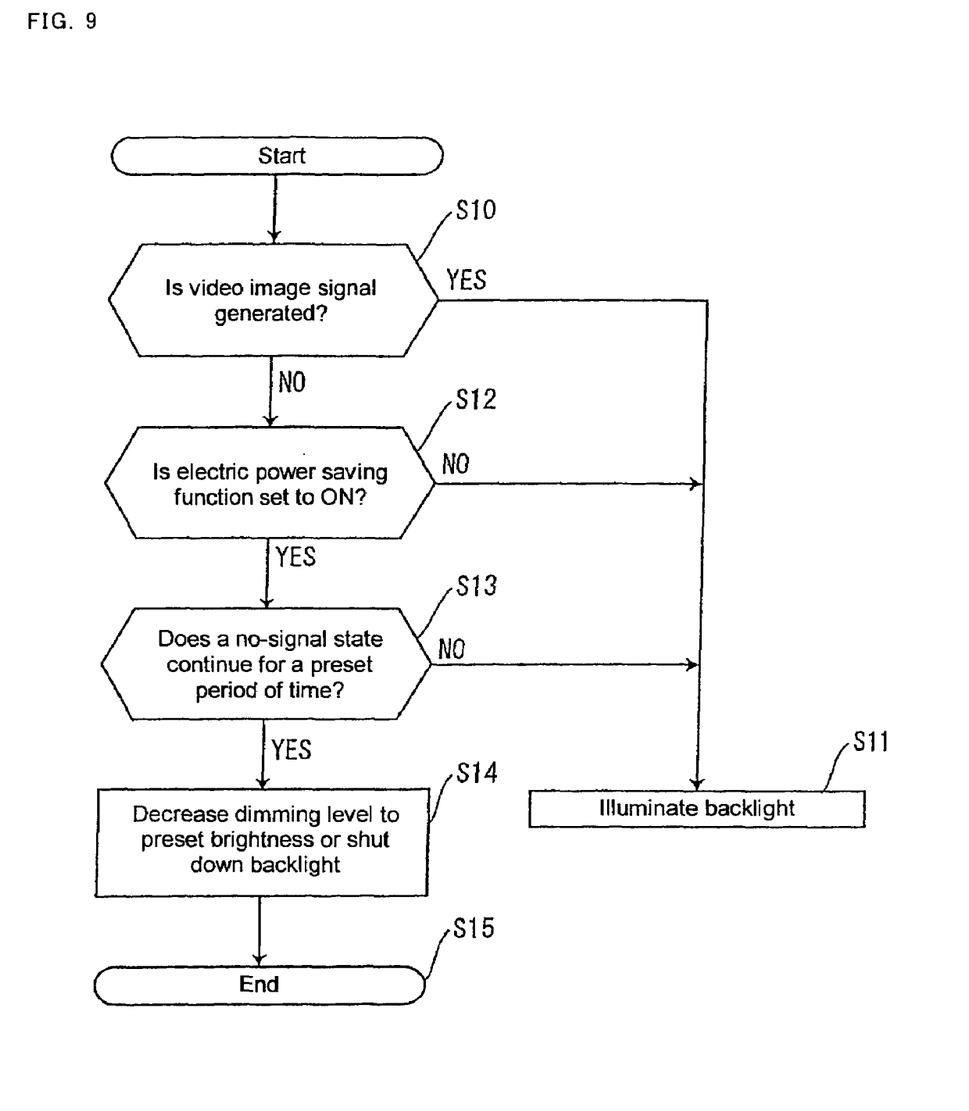
FIG. 9 is a flowchart showing control of a backlight when no signal is supplied, of the same electronic apparatus.

Now, control of the backlight 13 during an electric power saving mode will be described with reference to flow charts shown in FIGS. 9 to 11. FIG. 9 shows control of the backlight 13 when no signal is applied. First, it is judged whether or not a video image signal is generated (step S10). In the case where the video image signal is generated, the backlight 13 is illuminated (step S11). In the case where no video image signal is generated, it is judged whether or not an electric power saving function is set to ON (step S12). Then, a time interval at which the video image signal is not generated is measured by means of a counter section 20. In the case where a state in which no video image signal is generated continues for a time interval or more stored in a memory section 19, a dimming level of the backlight 13 is decreased to the preset brightness or the backlight 13 is shut down (steps S13, S14, and S15). In the case where a time interval at which no video image signal is generated is shorter than the time interval stored in the memory section 19, the backlight 13 is illuminated (step S11). In addition, in the case of a PC mode shown in FIG. 11, a processing operation similar to that in the flow chart shown in FIG. 9 is carried out. However, in the case of the PC mode, if a state in which no input signal is generated has continued by judging whether or not the input signal is generated, the dimming level of the backlight 13 is decreased to the preset brightness or the backlight 13 is shut down (steps S20, S22, S23, S24, and S25). In the case where the electric power saving function is turned OFF or in the case where a time interval at which no input signal is generated is shorter than the time interval stored in the memory section 19, the backlight 13 is illuminated (step S21).

Figure 10:
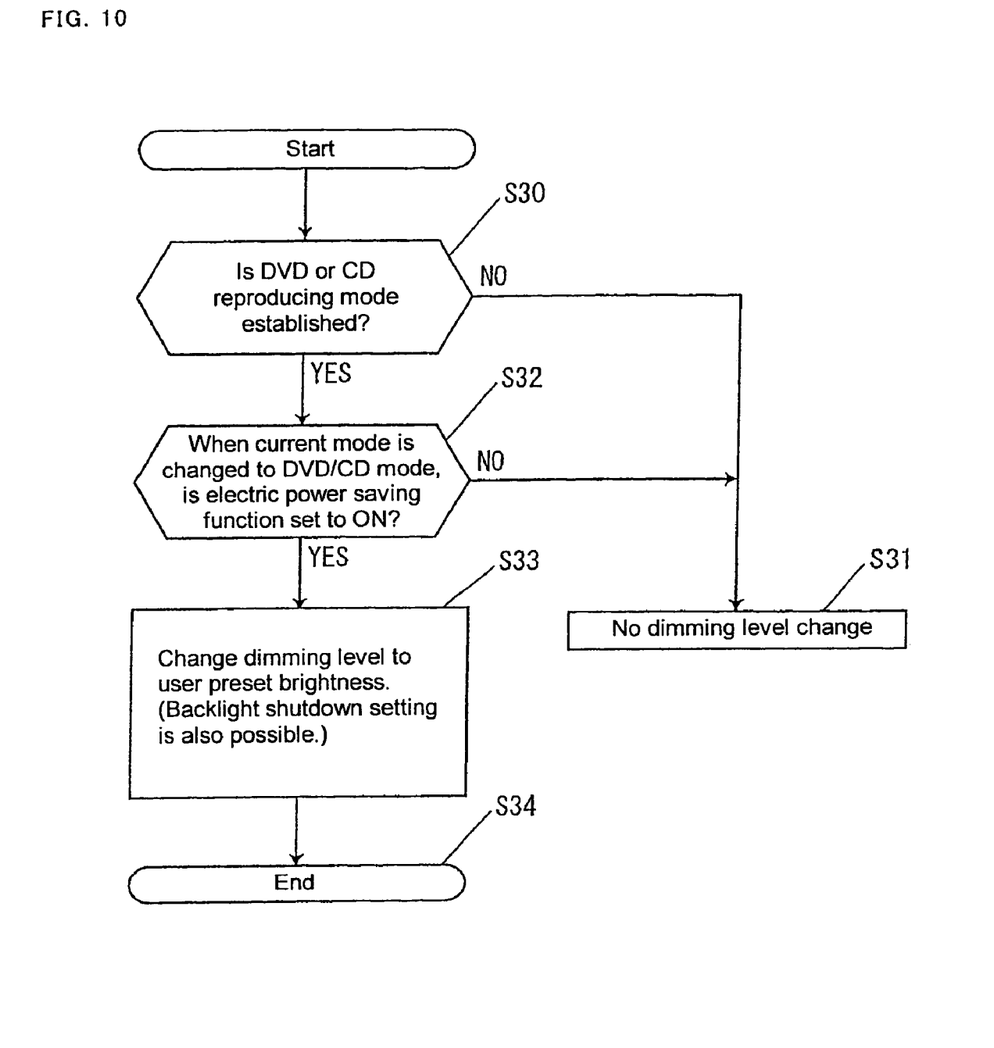
FIG. 10 is a flow chart showing control of a backlight during DVD/CD reproduction of the same electronic apparatus.
Figure 11:
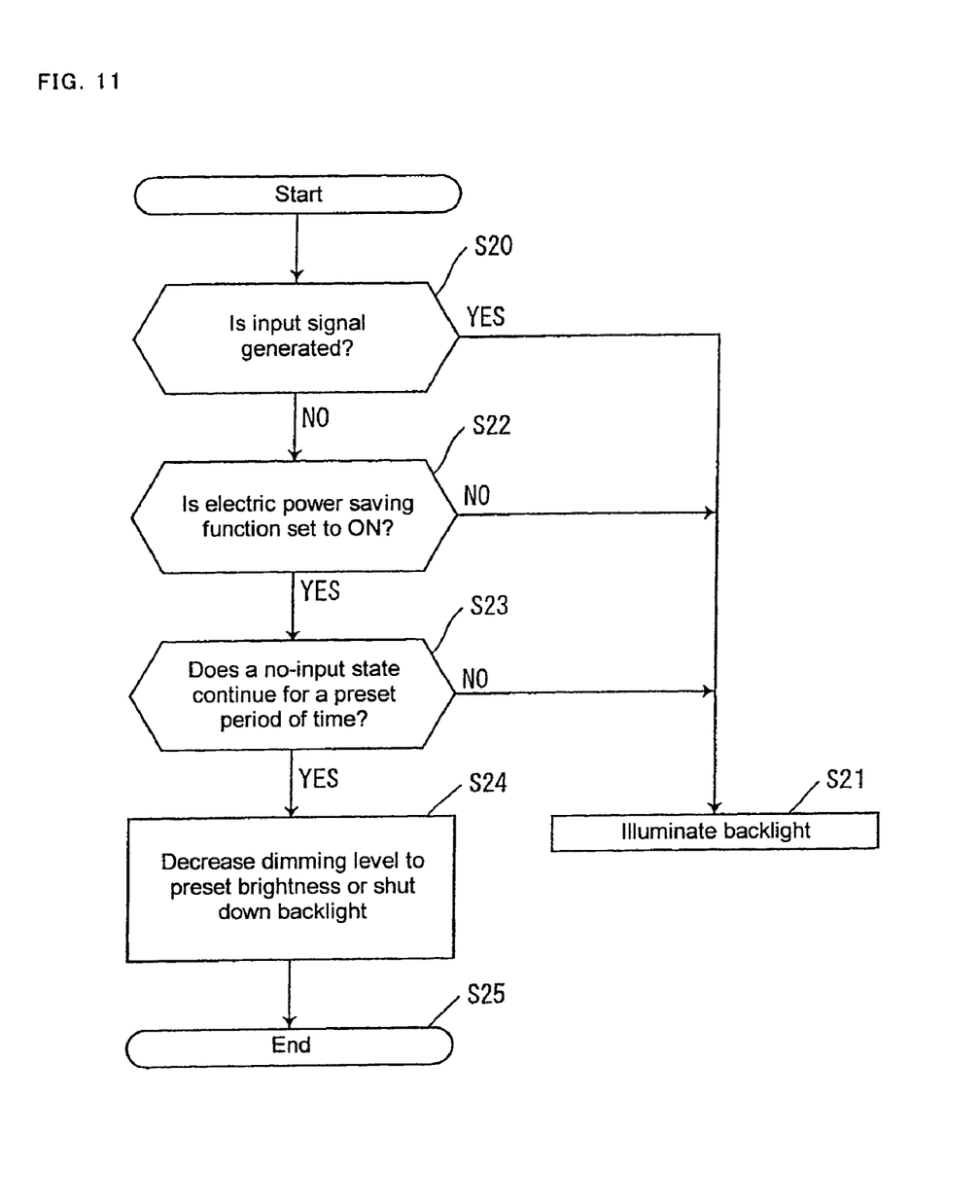
FIG. 11 is a flow chart showing control of a backlight during a PC mode of the same electronic apparatus.

During DVD/CD reproduction, as shown in FIG. 10, it is judged whether or not a DVD/CD reproducing mode is established (step S30). In the case where the DVD/CD reproducing mode is not established, the dimming level of the backlight 13 does not change (step S31). During the DVD/CD reproducing mode, it is judged whether or not the electric power saving function is set to ON (step S32). In the case where the function is set to ON, the dimming level is changed to the brightness preset by a user or the backlight 13 is shut down (step S33). In the case where this function is set to OFF, the dimming level of the backlight 13 does not change (step S31).

As has been described above, in the present embodiment, a plurality of electric power saving modes classified into groups by combining a plurality of electric power saving items are stored in the memory section 19, and one of the plurality of electric power saving modes is controlled to be set to ON/OFF, whereby there is no need for a user to individually select the plurality of electric power saving items, respectively, and ON/OFF settings can be provided all together for each group. Thus, an electric power saving mode can be selected very easily. In particular, as described in the present embodiment, in the composite type electronic apparatus, a variety of electric power saving items exist, and thus, the electric power saving mode can be efficiently selected, and excellent operability is achieved. Further, by setting a multilevel setting, when a high order group having a good power saving effect is selected, an electric power saving mode of a low order group is set to ON, thereby making it possible to select an electric power saving mode more easily. In addition, by selecting a manual setting, only the electric power saving functions desired by the user can be set to ON, and the electric power saving mode according to the user's preference or habit can be freely selected. In addition, when the electric power saving function is selected, if any one of groups 1 to 3 is selected so as to be set to ON, a current screen is changed to a warning display screen 43 according to the selected groups 1 to 3. Then, a disadvantage attained when that electric power saving mode has been selected is displayed so that a user can make a selection while judging the contents of that warning. Further, an electric power saving effect according to each electric power saving mode is graphically displayed on the display screen 44. For example, the fact that 10% electric power saving is possible can be displayed so that the user can judge its electric power saving effect in response to the selected electric power saving mode.

While an embodiment of the present invention has been described in detail up to now, the present invention is not limited to the above-described embodiment. Various modifications can occur without departing from the spirit of the invention. For example, while the foregoing embodiment has shown a composite type electronic apparatus formed by integrating a storing and reproducing unit such as a DVD or an HDD (hard disk drive) and a television image receiver, the present invention is not always limited thereto. In addition, the electric power saving modes classified into groups and the electric power saving items corresponding to each of the electric power saving modes may be selected as required without being limited to the foregoing embodiment. In addition, although a graphic display example has been shown when an electric power saving effect according to an electric power saving mode is displayed, this electric power saving effect may be visually displayed by a pie chart or a barcode and the like. Further, this effect may be merely displayed by numerical data or the like.

What is claimed is:

1. An electronic apparatus having an electric power saving function, comprising:
    display means for making a display in accordance with a command from control means;
    power supply control means for restricting or shutting down power supply to at least the display means when one of a plurality of electric power saving modes is controlled to be set to ON;
    storage means for storing the plurality of electric power saving modes,
    wherein each of the plurality of electric power saving modes includes electric power saving items selected from a plurality of electric power saving items, and one of the plurality of the electric power saving modes is controlled to be set to ON/OFF, thereby controlling the electric power saving items included in the one of the electric power saving modes to be set to ON/OFF all together;
    a warning display function for, when any one of the electric power saving modes is selected, displaying a disadvantage attained when the selected electric power saving mode is set to ON; and
    an electric power saving effect display function for indicating an electric power saving effect according to each of the electric power saving modes.

2. The electronic apparatus having an electric power saving function according to claim 1, wherein each of the electric power saving items in each of the electric power saving modes can be controlled to be set to ON/OFF individually.

3. The electronic apparatus having an electric power saving function according to claim 2, comprising a function for serially numbering the electric power saving modes and, when a high order electric power saving mode is set to ON, turning ON a low order electric power saving mode in conformity with the ON setting.

4. The electronic apparatus having an electric power saving function according to claim 3, wherein the display means is a liquid crystal display unit for use in a television image receiver or a personal computer, and at least one of the electric power saving modes includes power supply control for a backlight which illuminates the liquid crystal display unit during the electric power saving mode.

5. The electronic apparatus having an electric power saving function according to claim 2, wherein the display means is a liquid crystal display unit for use in a television image receiver or a personal computer, and at least one of the electric power saving modes includes power supply control for a backlight which illuminates the liquid crystal display unit during the electric power saving mode.

6. The electronic apparatus having an electric power saving function according to claim 1, comprising a function for serially numbering the electric power saving modes and, when a high order electric power saving mode is set to ON, turning ON a low order electric power saving mode in conformity with the ON setting.

7. The electronic apparatus having an electric power saving function according to claim 6, wherein the display means is a liquid crystal display unit for use in a television image receiver or a personal computer, and at least one of the electric power saving modes includes power supply control for a backlight which illuminates the liquid crystal display unit during the electric power saving mode.

8. The electronic apparatus having an electric power saving function according to claim 1, wherein the display means is a liquid crystal display unit for use in a television image receiver or a personal computer, and at least one of the electric power saving modes includes power supply control for a backlight which illuminates the liquid crystal display unit during the electric power saving mode.

* * * * *